United States Patent [19]

Braithwaite et al.

[11] 3,952,085

[45] Apr. 20, 1976

[54] REMOVAL OF BORON FROM MgCl$_2$ BRINES

[75] Inventors: David G. Braithwaite, Brookhaven, Miss.; R. Keith Darlington, Salt Lake City, Utah

[73] Assignee: NL Industries, Inc., New York, N.Y.

[22] Filed: Feb. 21, 1975

[21] Appl. No.: 551,750

[52] U.S. Cl. .............................. 423/158; 423/497; 423/658.5; 423/276; 423/628
[51] Int. Cl.$^2$ ..................... C01F 5/30; C01F 7/46
[58] Field of Search ........... 423/497, 499, 158, 184, 423/658.5

[56] References Cited

UNITED STATES PATENTS

| | | | |
|---|---|---|---|
| 2,402,959 | 7/1946 | Gustafson et al. | 423/497 X |
| 2,996,460 | 8/1961 | Braithwaite | 423/339 X |

*Primary Examiner*—Edward Stern

[57] ABSTRACT

Minute amounts of boron present in naturally occurring brines found in oceans, inland seas, salt lakes and the like are removed by treating the brine with an oxide of aluminum.

3 Claims, No Drawings

REMOVAL OF BORON FROM MgCl₂ BRINES

BACKGROUND OF THE INVENTION

Molten substantially anhydrous magnesium chloride is a widely used electrolyte for the production of electrolytic magnesium metal; and is commonly derived from brine concentrates comprising essentially magnesium chloride a typical process for producing these brine concentrates from naturally occuring brines being disclosed in U.S. Pat. No. 3,516,785 and included by reference. In brief, these brine concentrates are produced by subjecting naturally occurring brines to solar evaporation in a series of stages to form what is commonly referred to as a holding pond brine; and thereafter concentrating the holding pond brine in one or more stages to produce a brine concentrate consisting essentially of magnesium chloride, water and trace amounts of other metals and/or metal oxides including boron. This brine concentrate is then dehydrated, preferably by spray drying, and the substantially dry product melted to form a molten electrolyte.

Now it is well known that when a magnesium chloride electrolyte prepared from a brine concentrate and containing boron or a boron compound in proportions equivalent to as little as from 150 to 200 ppm boron is electrolyzed the magnesium metal does not coalesce readily but tends to form as discrete globules dispersed in the cell melt with the result that cell current efficiencies are lowered and significant amounts of magnesium metal end up in the cell smut.

It is important therefore to production of magnesium metal on plant scale that the magnesium chloride electrolyte be substantially free of boron or that the level of boron in the electrolyte be reduced sufficiently that its adverse affects on the coalescence of the magnesium metal and cell efficiencies be minimized.

Known methods for producing magnesium chloride electrolytes having low levels of boron include chlorination of the spray dried magnesium chloride concentrate either during melting of the spray dried material or subsequent thereto. However, removal of boron by chlorination is a slow and expensive process requiring long contact times in the melt cells and/or chlorinators, and the handling of large volumes of gaseous chlorine. As a result melt cell life is seriously shortened and catastrophic feeding and corrosion problems develope.

It is also known to reduce the level of boron in magnesium chloride electrolytes by extracting the boron from a magnesium chloride brine prior to forming the anhydrous cell feed material using liquid-liquid extraction techniques as described, for example, in British Pat. No. 1354944, U.S. Pat. Nos. 3,493,349, and 3,433,604 wherein extraction of the boron is effected by means of an organic extractant. However, these and other known processes for reducing the level of boron in magnesium chloride brines are prohibitively expensive on a commercial plant scale due to large losses of costly organic additives; or the elaborate and expensive regeneration techniques required to reclaim these additives.

It is desirable therefore, in the interest of the efficient electrolytic production of magnesium metal from salt brines on a commercial scale to provide a relatively simple, inexpensive method and means for forming substantially boron-free magnesium chloride electrolytes from naturally occuring brines consistent with the overall economy of the process.

SUMMARY OF INVENTION

In its broadest aspects then, the present invention is the discovery of a simple and relatively inexpensive method for treating naturally occuring brines and in particular brines derived from Great Salt Lake, Utah and in particular the holding pond brines derived therefrom so that the boron level in the brine is reduced sufficiently, prior to concentration and spray drying, that the necessity for chlorinating the spray dried material to remove boron is eliminated or at least minimized sufficiently to obviate the high costs and castastrophic problems attending present chlorination methods. More particularly it has now been found that these objectives can be achieved by reducing the level of boron in holding pond brines to at least as low as 100 ppm and preferably less than 50 ppm, efficiently and economically, by solid-liquid extraction using an inorganic extractant and in particular a metal oxide, the preferred metal oxide being alumina. While alumina in most any form is effective a preferred type of alumina is one which has a multiplicity of active sites as, for example, a spray-dried, very dense alumina, such as described in U.S. Pat. No. 2,996,460. Alumina in the form of microspheres as for example a commercial grade of alumina known as Nalform and sold by Nalco Chemical Co.: or Kaiser alumina produced by the Kaiser Aluminum Co. are also highly effective extractants. Further, it has been found that an aluminummagnesium complex identified as $AL_2O_3 \cdot MgO$ is also an effective extractant for the removal of boron from magnesium chloride brines. For purposes of brevity the above defined aluminas, including the aluminum-magnesium compound, are hereinafter referred to, generically as activated alumina.

PREFERRED EMBODIMENT

The naturally occuring brines may comprise essentially from 30.0 to 35.0% $MgCl_2$ and from 400 to 550 p.p.m. boron.

Pursuant to the method of this invention a salt lake brine which had been desulfated and decarnallited, using the procedures disclosed in U.S. Pat. No. 3,516,785 supra, having a specific gravity of about 1.327 and analyzing about: 34% Mg as $MgCl_2$, about 0.12% Na, about 0.06% K, about 0.11% Li, about 0.35% Ca, about 0.05% $SO_4$, and about 510 ppm boron is intimately contacted with an activated alumina in an amount in a range of from 0.5 to 20% on a brine weight basis and at about 80°C. for from about 30 to about 60 minutes after which the solid extractant is separated from the brine in any suitable manner as for example filtration, centrifuging or simply maintaining the slurry in a quiescent stage such that the solid extractant settles leaving a supernatant brine from which an appreciable portion of the boron has been removed by sorption in the extractant. If the level of boron in the supernatant brines is still too high following the first treatment then the supernatant brine may be treated again with activated alumina in substantially the same manner as hereinabove described to remove any residual boron the treatment process being capable of repetition until the boron level in the brine is reduced to less than 50 parts per million.

The amount of extractant added to the brine will depend on the compositions of the brine which, in turn, will vary depending upon where the brine is taken in the successive evaporation and concentration steps leading to the formation of a brine concentrate. In a plant scale operation the extractant would be added preferably following the desulfating step and before the first concentration step; or it may be added at any point thereafter prior to spray drying the concentrated brine, lesser amounts of extractant being required with increasing concentrations. Moreover effective removal of boron depends on the temperature of the brine solution during treatment dold brine solutions being unsatisfactory, a preferred temperature being from about 60° to 80°C.

The following examples will further illustrate the novel features of the instant invention.

EXAMPLE I

A desulfated, decarnallited brine was used which analyzed as follows:

| Sp. g. | %Mg as $MgCl_2$ | %Na | %K | %Li | Bppm | %Ca | %$SO_4$ |
|---|---|---|---|---|---|---|---|
| 1.377 | 34.2 | 0.12 | 0.061 | 0.11 | 780 | .35 | <0.05 | all percentages being on a brine weight basis. To 200 grams of this feed were added 50 grams activated alumina (Nalform) and the mixture was heated to about 80°C with stirring for about 50 minutes. The resulting slurry was then allowed to settle overnight and an analysis of the supernatant brine showed a residual boron content of only 93 ppm boron which is equivalent to about an 86.6% removal of boron from the original brine.

EXAMPLE II

In another run a decarnallitted brine was used analyzing about 35% magnesium chloride and having 350 ppm boron on a brine weight basis. 138 gms of 5–8 mesh Kaiser alumina microspheres were placed in a 500cc burette in which the spheres formed a bed having a depth of approximately 300 ml. Sufficient brine was then fed into the burette to fill the bed voids. The brine was then withdrawn from the burette at a rate of approximately 2 ml per minute. After 4 minutes the level of the boron in the effluent brine was approximately 10 ppm boron indicative of about a 97% removal of boron from the original brine.

EXAMPLE III

In this run the extractant used was the $Al_2O_3.MgO$ compound. 50 grams of this extractant were slurried with 150 ml desulfated holding pond brine analyzing about 30% MgCl and 400 parts per million boron. The mixture was stirred constantly while heating to 80° for 30 minutes. After 30 minutes the slurry was allowed to stand overnight and the supernatant brine was analyzed as containing only 18 parts per million boron or approximately 95% removal of boron from the original brine.

In the interest of determing whether or not this extractant could be regenerated it was treated with 200 ml of a 10% solution of mannitol at 70°C for about 5 minutes. The resulting filtrate was analyzed as containing 672 parts per million boron thereby showing that the extractant could be readily regenerated. While mannitol was particularly effective it will be understood that other organic compounds having adjacent hydroxyl groups in cis or trans-configuration may be used as for example glycerine, mannitol, sucrose sorbitol, or 1, 2-dihydroxy aromatic compounds such as catechols.

The present invention thus provides a simple and economical method for lowering the brine values in naturally occurring brines to a level sufficiently low such that when subsequently concentrated the magnesium chloride brine concentrate will contain no more than about 100 parts per million and preferably less than about 50 parts per million boron the process being characterized by the use of an inorganic extractant comprising activated alumina; the extractant being one which is amenable to regeneration quickly and efficiently by the use of an inexpensive reagent.

While the invention has been described and illustrated by the examples included herein it is not intended that the invention be strictly limited thereto and other variations and modifications may be employed within the scope of the appended claims.

We claim:

1. A method for removing boron from a magnesium chloride desulfated, decarnallited naturally occurring brine, wherein said brine comprises essentially from 30.0 to 35.0% $MgCl_2$ and from 400 to 550 ppm boron, by solid-liquid absorption extraction which comprises: intimately mixing said brine with a solid extractant comprising spray-dried, very dense, activated aluminum oxide microspheres, and the amount of activated alumina added to said brine being in the range of from 0.5 to 20.0% on a brine weight basis, heating a slurry of the mixture of brine and extractant at a temperature from about 60°C to about 80°C for about 30 to 60 minutes until the boron in said brine is reduced to less than 50 p.p.m., and then separating the essentially boron-free brine from said extractant after maintaining the slurry quiescent to effect gravity separation of the extractant from the supernatant brine.

2. Method for removing boron from naturally occurring brines according to claim 1 wherein the extractant comprises a composition of aluminum oxide and magnesium oxide identified as $Al_2O_3.MgO$.

3. Method for removing boron from naturally occurring brines according to claim 1 wherein said extractant is regenerated by treating the extractant with about a 10% solution of mannitol at temperature of about 70°C for about 5 minutes.

* * * * *